Nov. 25, 1969 W. LICHTI 3,480,294

TRACTOR CONTROL DEVICE

Filed Sept. 14, 1967

United States Patent Office 3,480,294
Patented Nov. 25, 1969

3,480,294
TRACTOR CONTROL DEVICE
Walter Lichti, Kelvin, Via Gunnedah,
New South Wales, Australia
Filed Sept. 14, 1967, Ser. No. 667,696
Claims priority, application Australia, Sept. 20, 1966,
11,341/66; Nov. 8, 1966, 13,597/66, 13,598/66
Int. Cl. B60d *1/00;* A01b *67/00*
U.S. Cl. 280—405                7 Claims

ABSTRACT OF THE DISCLOSURE

A means for ensuring that the traction wheels of a tractor have sufficient traction and comprising a beam mounted longitudinally below the axles of the tractor and pivoted near the traction wheels and a link attached to form a bell crank lever with the beam and attached to the draw bar. A mass located on the end of the beam applies a downward force near the traction wheels proportional to the reactive force applied by the load.

---

This invention relates to tractors, and more particularly to means for ensuring that the driving wheels of a tractor have sufficient traction to enable them to grip the ground without slipping to any substantial extent when such a tractor is drawing a load.

It is known that the dragging force which a tractor draw-bar applies to an implement or other object which it is desired to tow, will be slightly more than half the weight of the tractor, assuming that such a tractor has approximately equal weight distribution upon its two axles. That is to say, according to one theory, a tractor of weight W having a force W/2 acting downwards upon its rear axle, to which the driving wheels are normally attached, will draw a load which imparts a reaction force F in a substantially horizontal direction at the draw-bar without permitting the rear wheels to break traction or slip if W/2 exceeds F by a small amount. However, it is a problem with modern tractors wherein more powerful and lighter engines are being employed and wherein the dead weight of the tractor itself is tending to be reduced, for the vehicle as a whole to behave adequately as a road vehicle for the purpose of propelling itself, but in order to provide adequate traction when drawing loads, the average modern tractor must, of necessity, have approximately one-third of its own weight added to its rear end as ballast if it is to draw such loads effectively. For this reason it is now customary to provide artificial loading at the rear end by such expedients as partly filling the rear tires with water, or by bolting massive metal weights to the rear wheel hubs, either permanently or when actually drawing a load. It has been found, however, that such methods are uneconomical owing to the extra fuel required to move the artificial weights, and in any case, a slight slipping action still occurs when the tractor transmission engages its lower ratio gears, and the wheel slip thus engendered is again wasteful owing to excessive tire tread wear.

A further disadvantage of conventional tractors flows from the custom of mounting the draw-bar at a somewhat lower level than the rear axle to ensure that the rear wheels tend to slip with respect to the ground before a sufficient overturning moment can be engendered which would otherwise overturn the tractor backwards by rotating the chassis bodily about the rear axle which achieving a grip between the rear wheels and the ground.

It is therefore an object of the present invention to provide means which replace the above-described fixed ballast arrangements and which effectively apply a variable downward pressure in the region of the rear axle of the tractor, said pressure being a function of the magnitude of the reactive force applied to it by a load which it is actually drawing. It is a further object of the invention to reduce the bouncing of the rear axle of the tractor which tends to occur when traversing rough ground. A still further object of the invention is to reduce the tendency of the front axle of the tractor to lift when drawing heavy loads.

According to the invention therefore, in one of its aspects, a tractor control device comprises means whereby the tractor draw-bar is mounted upon a link at some finite distance above the level of the pivotal point of attachment of said link to the chassis of said tractor, but below the level of the center of the rear axle, and means wherby a mass located at or near the end of a beam co-extensive with said link to form a bell-crank lever applies a downward force in the region of said rear axle proportional to the reactive force applied to said tractor by a load which is towed by said tractor via said draw-bar.

The purpose of this arrangement is to apply a downward force in addition to the usual fraction of the total dead weight of the tractor to the rear or driving wheels, and the effectiveness of the ararngement is greater in proportion to the extent that the tractor is initially lighter. Preferably, means are provided to vary the height of attachment of the draw-bar above the level of the fulcrum point (or pivotal point of attachment of said link to the chassis) because in the case of light tractors which are required to draw heavy loads, there is a greater need to apply a sufficient downward force to the rear wheels.

However, if the point of attachment of the drawbar is too high, the tractor's resistance to overturning in the above-described manner is diminished. To counteract this loss of resistance to overturning, more weight is desirably placed at or near the front end of the tractor chassis.

Particular embodiments of the invention will now be described with reference to the accompanying drawings in which similar references indicate corresponding parts, and in which similar references indicate coresponding parts, and in which.

Figure 1:
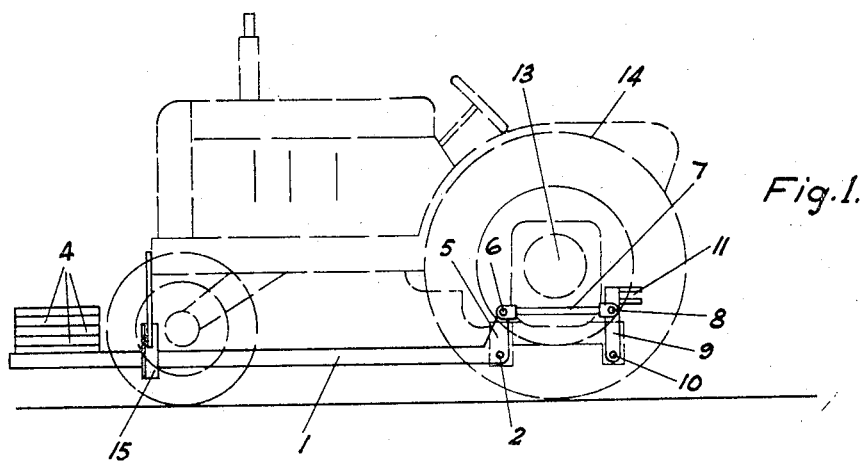
FIGURE 1 shows, in side elevation, a tractor fitted with apparatus constructed in accordance with the invention.
Figure 2:
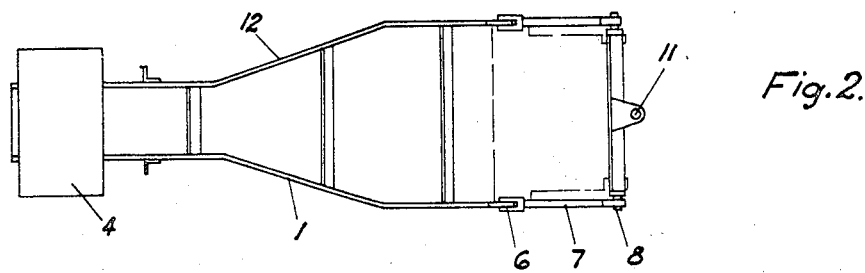
FIGURE 2 shows, in plan, the apparatus of FIGURE 1 with unessential parts of the tractor omitted in the interests of clarity.

Upon referring to FIGURE 1 of the drawings it will be seen that a beam 1 is pivoted about a hinge 2 with respect to the chassis of a tractor and is thus able to be tilted about said hinge in a plane which is substantially vertical and parallel to the principal axis of the tractor. Upon the outer lefthand end of said beam a platform 3 supports one or more masses 4. A bell crank lever 5 which is co-extensive with the beam 1 is, in turn, connected via the hinge 6 to the link 7 which is attached via the hinge 8 to a lever 9, the lower end of which is pivoted to the chassis by means of the hinge 10. The upper end of the lever 9 terminates in a draw-bar 11 to which loads are adapted to be attached. As best shown in FIGURE 2, a beam 12 similar to the beam 1, is mounted on the far side of the tractor so as to provide a symmetrical arrangement whereby the masses 4 may effectively apply a downward force in the region of the rear axle 13 without interference with either beam by the depending parts of the tractor which do not form part of the present invention.

For similar reasons, the draw-bar 11 is attached to the lever 9 and not directly to the bell crank lever 5, so that said draw-bar may be located in a suitable working position to the rear of the differential housing and other parts of the tractor located at or near said rear axle.

Upon attaching a load to the draw-bar, and putting the tractor into forward motion, the lever 9 tends to rotate in a clockwise sense about hinge 10 and thus causes the bell crank lever 5 to rotate in the same sense about the hinge 2 and thereby lift the masses 4. However, the magnitude of the said masses is so selected that a sufficient downward application of force is applied over the hinge 2 as the wheel 14 makes traction and proceeds to roll. Thus, a high proportion of the downward force upon the hinge 2 is applied as a downward force upon the axle 13, provided that a reactive load is maintained upon the draw-bar 11.

It will be appreciated that this application of pressure downwardly over the axle 13 ceases when said reactive force ceases and the gravitational force which acts downwardly upon the masses 4 is then again applied through the center of gravity of said masses. To prevent the collapse of the beam 1 under such circumstances, a stop 15 is attached to the forward end of the chassis so as to limit the downward rotation of said beam about the pivot 2.

When sufficient weight has been placed on said platform, it is found that not only is an effective amount of traction provided for the rear wheels, but the tendency of said rear wheels to bounce when traversing rough ground is greatly reduced. Furthermore, the tendency for the tractor to overturn by lifting its front axle is prevented owing to the fact that the required overturning moment is now too large. However, if more than a sufficient total weight is located upon said platform for the abovementioned purposes, the tractor will, of course, be difficult to steer, owing to the increased proportion of its dead weight which now acts through its front wheels.

Preferably, the driver of a tractor equipped in accordance with the invention should have displayed before him suitable means which continuously indicate the effective application of downward force to the rear end of the tractor, so that any necessary manual control of said force may be made by the driver to provide sufficient traction.

Figure 3:
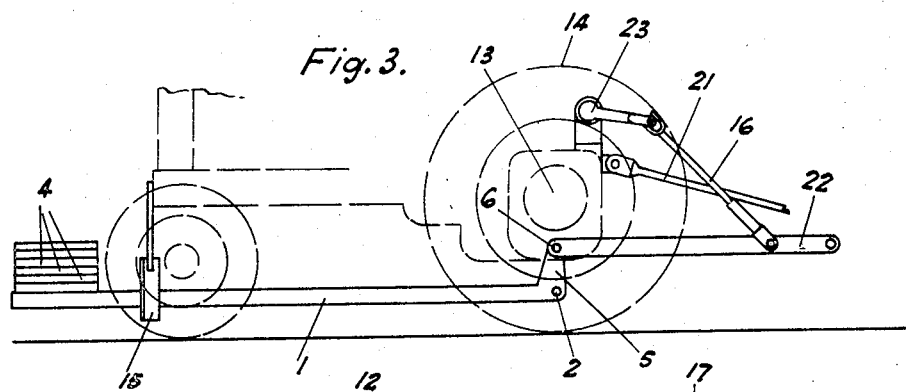
FIGURE 3 shows a modification of the apparatus of FIGURES 1 and 2 using a so-called "three-point-linkage."
Figure 4:
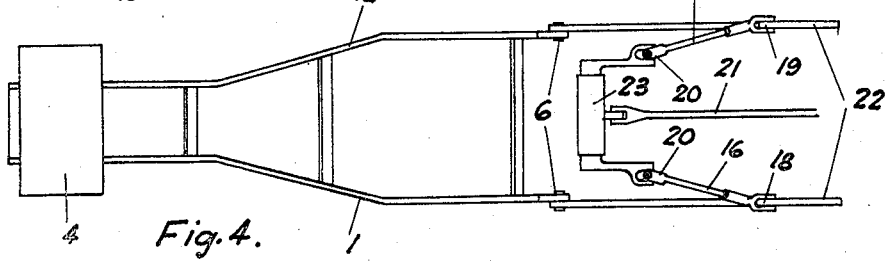
FIGURE 4 shows, in plan, the essential parts of the apparatus in FIGURE 3.

In a modification of the invention, shown in FIGURES 3 and 4, a so-called "three-point-linkage" is employed. This linkage consists of a pair of stiff struts 16 and 17 pivoted respectively to the arms 22 via the hinges 18 and 19. At the upper ends of said struts, universal joints 20 are mounted respectively so as to permit raising or lowering of the rear arms 22 about the hinge 6 by rotating a suitable hydraulic or other control device 23, the extensions of which engage the universal joints 20. A further hinged strut 21 is adapted to connect the chassis of the tractor to a load in known manner.

The last-mentioned arrangement is valuable for retracting the arms 22 when the tractor is being transported over public roads and the like. It will be seen that this arrangement possesses the known advantages of three-point-linkage type tractors even when used for the purpose of pulling large loads. In particular, the invention permits full advantage to be taken of the more desirable light-weight type of tractor having a high horsepower or high power-to-weight ratio. An inherently economical lightweight or high-powered tractor may thus be put to general use for pulling loads of widely different weights, without detracting from its economy for pulling occasional light loads. Nevertheless, when used for pulling heavy loads its good tractive properties ensure that its usefulness is limited only by engine power or by the strength of its chassis, drive-train and other components, but not by such factors as wheel slip.

Figure 5:
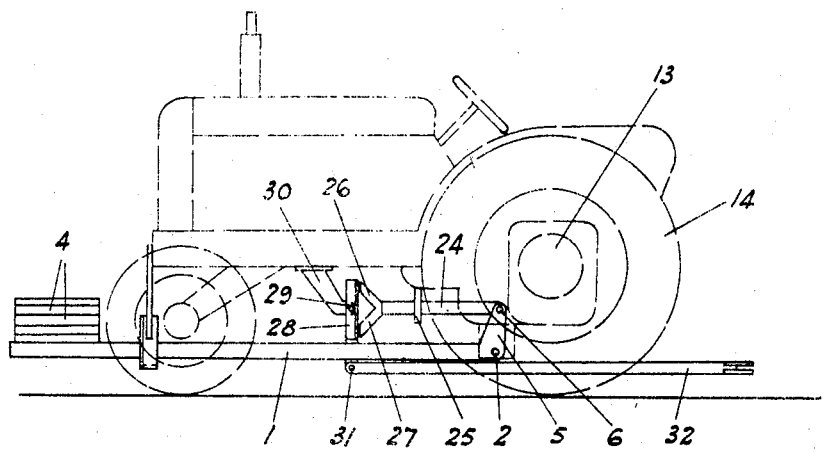
FIGURE 5 shows, in side elevation, a further modifiaction of the apparatus of FIGURES 1 and 2.
Figure 6:
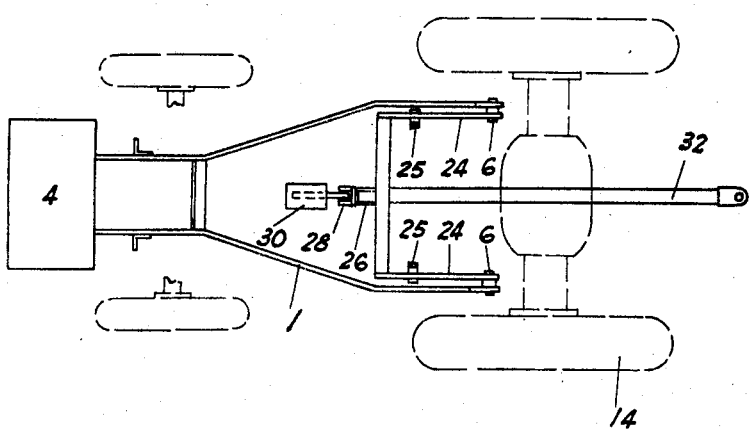
FIGURE 6 shows, in plan, the essential parts of the apparatus of FIGURE 5.

In a further modification of the invention shown in FIGURES 5 and 6, a further pair of levers 24 is adapted to rotate freely with respect to the hinges 6 within the limits of travel provided by the guides 25. Said levers terminate at the lefthand end in a bar which supports the upper and lower branches 26 and 27 respectively of a fork rigidly attached to said bar. Said fork is spaced from a rocking link 28 by a small clearance. The link 28 is adapted to rock about the hinge 29 which is, in turn, mounted upon the bracket 30 which is, in turn, rigidly attached to the tractor chassis. At the lower end of the link 28, a hinge 31 is provided about which the draw-bar 32 may turn freely.

Thus, it will be seen that when the tractor is pulling a load via the draw-bar 32, the latter tends to move to the right thereby bringing the link 28 into contact with the lower branch 27 as said link rotates anti-clockwise about the hinge 29. As a consequence the lever 24 moves to the right and thereby causes the bell-crank lever 5 to rotate clockwise about the hinge 2 thus raising the beam 1 and the masses 4 with a result similar to that achieved with the first embodiment of the invention above-described. When, however, the tractor is being pushed by a load, as, for example, when descending a hill, the draw-bar 32 tends to move to the left, thus causing the link 28 to rotate in a clockwise sense about the hinge 29, thus making contact with the upper branch 26 and pushing he lever 24 to the right and again rotating the bell-crank lever 5 in a clockwise sense so as to raise the beam 1 and the masses 4, with the result that the increase in downward pressure in the region of the rear axle 13 of the tractor is maintained in the same manner as when the tractor is drawing the load.

It will be appreciated that the invention, in any one of its embodiments above, although described with respect to tractors, is applicable also to other vehicles, such as bulldozers, graders, towed rollers, front-end loaders, and the like. In particular, the invention, insofar as it relates to the provision of assemblies below rear axle level, is applicable also to so-called rear-end loaders.

It will be appreciated also that the invention is just as useful for tractors using a three-point linkage as for those which use a simple draw-bar linkage. In prior systems using the three-point linkage, wherein both the points of attachment of the draw-bar are below the level of the rear axle, a tractor so equipped can only pull horizontally with a force approximately equal to $W/2$. But if both said points of attachment are above the level of the fulcrum as provided by the invention, then the same benefits are achieved as in the above-described embodiments of the invention wherein the tractor is a simple draw-bar tractor.

In a modification of the invention, a disc plow comprises means whereby its draw-bar is mounted in a manner which is analogous with the system employed in the tractor above described.

It is known that, as the number of discs of a multiple disc plow is increased, there is less penetration of the soil by the discs because of the lower pressure imparted to the ground by the dead weight of the plow itself. That is to say, a multiple disc plow tends to behave like a platform which rides upon the surface of the soil.

If there is insufficient soil penetration due to the above-described cause and/or due to the fact that the soil is too hard, the discs tend to act as wheels and steer the plow. However, because the point of attachment of the draw-bar to a tractor or other towing device is fixed, the entire frame of the plow tends to yaw towards the portion of the ground which is not yet plowed. This is partly due to the fact that, in known systems, all three wheels of the plow are fixed in height with respect to the frame so that said height predetermines the plowed depth.

Attempts have been made to overcome the above disadvantage by mounting auxiliary dead weights on or about the frame of a plow, but such expedients have been found insufficient in most cases.

It is an object of the last-mentioned modification of the invention to improve the adhesion of said wheels with respect to the ground so that the lateral reactive forces which the wheels impart to the ground are sufficient to prevent the discs from themselves acting as wheels, and thereby lessening the capacity of the disc system to both penetrate the soil and urge it sideways in the desired manner. It is a further object of said modification of the invention to achieve the last-mentioned effect without using very heavy frames whose weight would be economically unjustified in those cases where a lightweight plow would be suitable for penetrating softer soil with comparative ease.

According to said modification of the invention, therefore, a disc plow control device comprises means whereby the plow's draw-bar is mounted upon a link at some finite distance above or below the level of the pivotal point of attachment of said link to the frame of the plow, and means whereby a mass located at or near the end of a beam coextensive with said link to form a bell-crank lever, applies a downward force in the region of the disc of said plow proportional to the tractive force applied to said draw-bar by a towing vehicle.

Said last-mentioned vehicle may, for example, be the tractor in one of its embodiments above-described.

Figure 7:
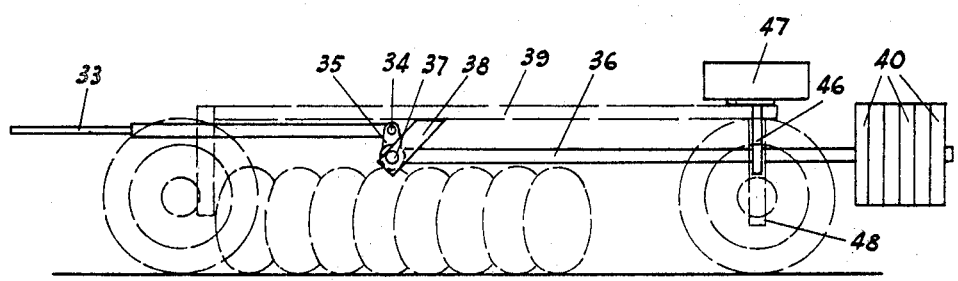
FIGURE 7 shows, in side elevation, a plow fitted with an apparatus constructed in accordance with the invention.

Said modification will now be described with reference to FIGURES 7 and 8 of the drawings. In FIGURE 7 the draw-bar 33 is attached by means of a hinge 34 to the bell-crank lever 35 which is coextensive with the beam 36 which is, in turn, pivoted about the hinge 37 which is mounted upon the bracket 38 which is, in turn, rigidly attached to the frame 39 of the plow. At or near the righthand end of the beam 36, the masses 40 are removably attached. Thus, upon applying to the draw-bar 33 a substantially horizontal tractive force in the left-hand sense, any tendency, for an anti-clockwise rotation of the bell-crank lever 35 and hence of the beam 36 to lift the masses 40, is resisted by said masses so that a downward force is effectively applied over the fulcrum provided by the hinge 37. Hence, a substantial part of said force is applied downwardly to the ground in the general region of the center of gravity of the member 41 to which the discs 42 are attached. This ensures that said downward force is applied where it has the desired effect, namely, in the region of the discs, to a greater extent than in the region of the wheels 43, 44 and 45. Any tendency of the beam 36 to fall beyond desired limits when no tractive force is applied to the plow or to rise unduly when said tractive force is too great for the masses 40 to control, may be prevented by the provision of a stop 46 which is rigidly attached to the frame 39. In view of the fact that the downward force is applied mainly in the region of the discs 42, it is desirable to provide also a mass 47 at or near the rear wheel 43 to keep the latter firmly in contact with the ground. The mass 47, which may be fixed in magnitude, is attached rigidly to the shaft 48.

To preset the steering angle of the wheels 44 and 45, the arm 49 may be selectively fastened to the draw-bar 33 as shown, so as to vary the angle between the member 51 and the member 41 by causing the arm 49 to rotate said member 51 via the pivot 50. The wheel 44 is turned through the same angle as the wheel 45 owing to the provision of the rigid strut 52.

It has been found in tests leading to the present invention that the above-described arrangement ensures that the discs 42 tend to continue plowing ground which would not otherwise be adequately penetrated, and the effective plowing action is a result of the fact that the three wheels 43, 44 and 45 which control the plow can be given sufficient adhesion by adjustment of the masses 40, so that said wheels do not tend to slip sideways with respect to the ground, but act as depth controls only, and hence the individual discs tend to follow a path dictated by the geometrical configuration of the discs upon the frame 39 and the wheels upon the frame.

It will be seen that the frame 39 of the plow can now be made free to slide up and down so as to follow any unevenness in the ground's surface. As a result of the extra downward pressure applied to the wheels 43, 44 and 45, any excessive bouncing of the plow is prevented, even if said wheels are rubber tired, and if any particular part of the ground is too hard for penetration the discs do not leave the furrows, but merely rise temporarily.

The masses 40 should be chosen to suit the existing soil conditions. Thus, they should be large enough to hold the rear wheel 43 in contact with the ground at all times during plowing, but should not be so large that they diminish the main application of downward force at the center of gravity of the member 41 which is supplied via said beam 36.

Although the last-mentioned modification of the invention has been described herein with reference to a multiple disc plow, it will be understood that the downward force, provided by the invention, for the purpose of improved adhesion of the supporting wheels, is also applicable to other soil penetrating implements, such as scarifiers and the like.

Figure 8:
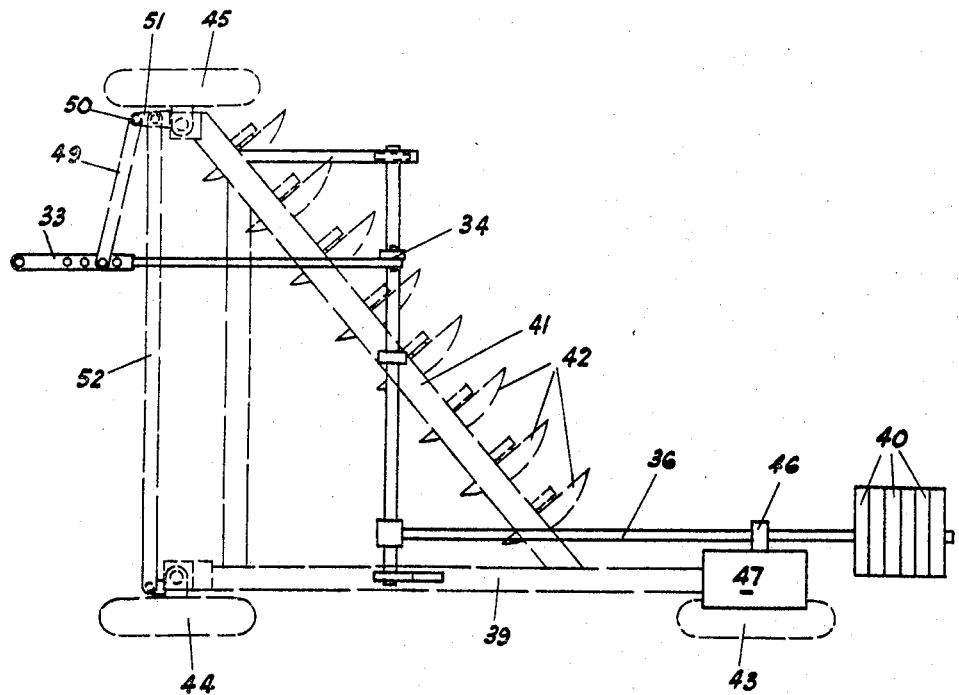
FIGURE 8 shows, in plan, the essential parts of the apparatus of FIGURE 7.

It will be appreciated that the plow shown in FIGURES 7 and 8 is adapted to be drawn by a tractor such as that of FIGURES 1 and 2, by connecting the draw-bar 33 to the draw-bar 11. Alternatively, a tractor such as that of FIGURES 5 and 6 may be used, by connecting the draw-bar 33 to the draw-bar 32. In each case, the connected draw-bars need to be at substantially the same height so as to pull with a substantially horizontal force. If drawn by a tractor such as that of FIGURES 3 and 4 the plow would, of course, be adapted for connection to the three-point linkage in known manner.

What is claimed is:

1. In a tractor or like vehicle, a device for ensuring the driving wheels have sufficient traction comprising link means, one end of which is pivotally attached to the chassis of the tractor, towing means attached to said link above said pivot point, beam means extending longitudinally of said tractor with one end connected to said link means to form a bell crank lever therewith, and an adjustable mass mounted on the free end of said beam means whereby a reactive force applied to said tractor by a load attached to said towing means causes rotation of said bell crank lever to apply a downward force in the region of the rear axle of the tractor proportional to said reactive force.

2. A device according to claim wherein said towing means comprises a draw-bar attached to said link means below the level of the center of the rear axle of the tractor.

3. A device according to claim 2 further comprising means for varying the point of attachment of said draw-bar to said link means.

4. A device according to claim 2 further comprising at least one intermediate lever connecting said draw-bar to said link means.

5. A device according to claim further comprising stop means rigidly attached to the chassis of said tractor, said stop means limiting the motion of said beam means in the absence of said reactive force.

6. A device according to claim 1 wherein said towing means comprises a three-point linkage.

7. A device according to claim 2 further comprising a rocking lever pivotally connected to the chassis of the tractor forwardly of said link means, said draw-bar pivotally connected to said rocking lever, fork means formed on one end of a strut the other end of which is pivotally connecetd to said link means, whereby pulling and pushing forces upon said draw-bar by said load cause said rocking lever to engage either side of said fork means thereby causing rotation of said bell crank lever to effect the desired downward force.

References Cited

UNITED STATES PATENTS

| 528,511 | 10/1884 | Railsback | 172—181 |
| 2,247,680 | 7/1941 | Graham | 172—611 X |
| 2,440,550 | 4/1948 | Martin | 172—611 X |

FOREIGN PATENTS 1,010,926  11/1965  Great Britain.

LEO FRIAGLIA, Primary Examiner

U.S. Cl. X.R.

172—611, 790; 280—460